US012790453B2

(12) United States Patent
Yao et al.

(10) Patent No.: US 12,790,453 B2
(45) Date of Patent: Nov. 10, 2026

(54) CELLULOSIC PARTICLE

(71) Applicant: FUJIFILM Business Innovation Corp., Tokyo (JP)

(72) Inventors: Kenji Yao, Kanagawa (JP); Ayu Naito, Kanagawa (JP); Kazusei Yoshida, Kanagawa (JP); Yuko Iwadate, Kanagawa (JP); Masahiro Oki, Kanagawa (JP); Tetsuya Taguchi, Kanagawa (JP); Hirokazu Hamano, Kanagawa (JP); Takahiro Ishizuka, Kanagawa (JP); Hideaki Yoshikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 645 days.

(21) Appl. No.: 18/071,531

(22) Filed: Nov. 29, 2022

(65) Prior Publication Data

US 2023/0391970 A1 Dec. 7, 2023

(30) Foreign Application Priority Data

Feb. 8, 2022 (JP) ................................ 2022-017989

(51) Int. Cl.

*C08L 1/02* (2006.01)
*C08G 73/02* (2006.01)
*C08J 7/04* (2020.01)
*C08K 5/00* (2006.01)
*C08K 7/18* (2006.01)

(52) U.S. Cl.

CPC ........ *C08J 7/0423* (2020.01); *C08G 73/0206* (2013.01); *C08K 5/0091* (2013.01); *C08K 7/18* (2013.01); *C08J 2301/02* (2013.01); *C08J 2391/06* (2013.01); *C08K 2201/013* (2013.01); *C08K 2201/018* (2013.01)

(58) Field of Classification Search

CPC .. C08L 1/02; C08L 29/04; C08L 91/06; C08L 39/00

See application file for complete search history.

(56) References Cited

U.S. PATENT DOCUMENTS

| | | | | |
|---|---|---|---|---|
| 2015/0265543 | A1 * | 9/2015 | Popov .................. | A61K 31/522 514/410 |
| 2018/0280256 | A1 | 10/2018 | Watanabe et al. | |
| 2021/0032372 | A1 | 2/2021 | Iwasa et al. | |
| 2021/0032415 | A1 | 2/2021 | Yoshimura et al. | |
| 2022/0142900 | A1 * | 5/2022 | Kobayashi ............... | C08J 3/128 |
| 2024/0041710 | A1 | 2/2024 | Abe | |

FOREIGN PATENT DOCUMENTS

| | | |
|---|---|---|
| JP | 2018172578 | 11/2018 |
| JP | 2020075878 | 5/2020 |
| JP | 2020132616 | 8/2020 |
| JP | 2021021044 | 2/2021 |
| JP | 2021021045 | 2/2021 |
| JP | 6872068 | 5/2021 |
| JP | 6921293 | 8/2021 |
| JP | 2022022947 | 2/2022 |

OTHER PUBLICATIONS

"Notice of Reasons for Refusal of Japan Counterpart Application", issued on Dec. 2, 2025, with English translation thereof, p. 1-p. 5.

* cited by examiner

*Primary Examiner* — Hai Y Zhang
(74) *Attorney, Agent, or Firm* — JCIPRNET

(57) ABSTRACT

A cellulosic particle contains cellulose as its base constituent. If hydrophobized silica particles are attached to the cellulosic particle, the percentage detachment upon sonication of the silica particles is 50% or less.

10 Claims, No Drawings

CELLULOSIC PARTICLE

CROSS-REFERENCE TO RELATED APPLICATIONS

This application is based on and claims priority under 35 USC 119 from Japanese Patent Application No. 2022-017989 filed Feb. 8, 2022.

BACKGROUND

(i) Technical Field

The present disclosure relates to a cellulosic particle.

(ii) Related Art

In Japanese Unexamined Patent Application Publication No. 2020-132616, "oily solid cosmetics containing surface-treated spherical cellulose powder with an average particle size of 1.0-30.0 μm." are proposed.

In Japanese Patent No. 6872068, "resin beads formed of a resin containing cellulose as a main component, wherein the particle size at a cumulative percentage of 50% in terms of volume is 50 μm or less, the sphericity is 0.7-1.0, the surface smoothness is 70-100%, the solidity is 50-100%, the five-day biodegradability measured according to JIS K6950: 2000 (ISO 14851:1999) is 20% or greater, and the content of cellulose in the resin is 90-100 mass %." are proposed.

SUMMARY

Aspects of non-limiting embodiments of the present disclosure relate to a cellulose-based cellulosic particle that may be superior in biodegradability and unlikely to aggregate compared with cellulosic particles for which if hydrophobized silica particles are attached thereto, the percentage detachment upon sonication of the silica particles exceeds 50%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a cellulosic particle containing cellulose as a base constituent, wherein if hydrophobized silica particles are attached to the cellulosic particle, a percentage detachment upon sonication of the silica particles is 50% or less.

DETAILED DESCRIPTION

Exemplary embodiments of the present disclosure will now be described. The following description and the Examples are for illustrating exemplary embodiments and do not limit the scope of aspects of the present disclosure.

In a series of numerical ranges presented herein, the upper or lower limit of a numerical range may be substituted with that of another in the same series. The upper or lower limit of a numerical range, furthermore, may be substituted with a value indicated in the Examples section.

A constituent may be a combination of multiple substances.

If a composition contains a combination of multiple substances as one of its constituents, the amount of the constituent represents the total amount of the substances in the composition unless stated otherwise.

Cellulosic Particles

Cellulosic particles according to an exemplary embodiment contain cellulose as their base constituent, and if hydrophobized silica particles are attached to the cellulosic particles, the percentage detachment upon sonication of the silica particles is 50% or less.

Configured as described above, the cellulosic particles according to this exemplary embodiment may be superior in biodegradability and unlikely to aggregate. A possible reason is as follows.

Particles containing cellulose (hereinafter referred to as cellulosic particles) may be advantageous in that they may be highly biodegradable by virtue of containing cellulose. Cellulosic particles, however, easily aggregate because of containing cellulose, and this has limited their applications.

The aggregation of cellulosic particles appears to be because hydroxy groups in the cellulose are present on the surface of the cellulosic particles, and because these hydroxy groups form hydrogen bonds.

To address this, the cellulosic particles according to this exemplary embodiment contain cellulose as their base constituent, and if hydrophobized silica particles are attached to the cellulosic particles, the percentage detachment upon sonication of the silica particles is 50% or less.

A percentage detachment upon sonication of the silica particles of 50% or less means that the hydrophobicity of the surface of the cellulosic particles tends to be high. This is presumably because in that case cellulose on the surface of the cellulosic particles contains only a small quantity of hydroxy groups. The formation of hydrogen bonds by hydroxy groups present on the surface of the cellulosic particles, therefore, is rare.

For this reason, presumably, the cellulosic particles according to this exemplary embodiment, configured as described above, may be superior in biodegradability and unlikely to aggregate.

Cellulose

The cellulosic particles according to this exemplary embodiment contain cellulose as their base constituent.

In this context, the term containing cellulose as a base constituent (or "cellulose-based") means the cellulose content of the cellulosic particles is 90% by mass or more.

The number-average molecular weight of the cellulose may be 37000 or more, preferably 45000 or more.

There is no particular upper limit to the number-average molecular weight of the cellulose, but for example, the number-average molecular weight may be 100000 or less.

Making the number-average molecular weight of the cellulose 37000 or more may make it more likely that the cellulosic particles are superior in biodegradability and unlikely to aggregate. A possible reason is as follows.

Making the number-average molecular weight of the cellulose 37000 or more may make the number of terminal hydroxyl groups per unit volume of the particles small enough that intramolecular and intermolecular hydrogen bonding is reduced; the cellulosic particles, therefore, may be unlikely to aggregate. As for biodegradation, the reduced aggregation of the cellulosic particles may help improve biodegradability, too, because the specific surface area increases in that case.

For this reason, presumably, it may be more likely that the cellulosic particles are superior in biodegradability and unlikely to aggregate.

The number-average molecular weight of the cellulose is measured by gel permeation chromatography (differential refractometer, Optilab T-rEX, Wyatt Technology; multiangle light scattering detector, DAWN HELEOS II, Wyatt Technology; columns, one TSKgel α-M and one α-3000, Tosoh) with dimethylacetamide eluent (containing 0.1 M lithium chloride).

Percentage Detachment Upon Sonication

If hydrophobized silica particles are attached to the cellulosic particles according to this exemplary embodiment, the percentage detachment upon sonication of the silica particles is 50% or less.

The measurement of the percentage detachment upon sonication of the silica particles is done as follows.

Ten grams of the cellulosic particles of interest and 2 g of hydrophobized silica particles (Nippon Aerosil “AEROSIL R972,” silica dimethyl silylate particles) are mixed together for 2 minutes at a rotational frequency of 200 rpm using a sample mill SK-M10 (Kenis) to add the hydrophobized silica particles to the cellulosic particles. The cellulosic particles with silica particles added thereto are analyzed using an x-ray fluorescence analyzer (product name, EA1400; Hitachi High-Tech Science); the net intensity of lines from silicon atoms is measured and reported as the silica particles content before sonication.

All of the cellulosic particles with silica particles added thereto are put into 500 g of water, and the resulting mixture is sonicated (38 kHz, 5 minutes) to give a sonicated dispersion. The sonicated dispersion is centrifuged (centrifuge, product name CF03, Kenis; centrifugal force, 2000 G; duration of centrifugation, 10 minutes), and the precipitate is collected by removing the supernatant by decantation. The collected precipitate is analyzed using the x-ray fluorescence analyzer; the net intensity of lines from silicon atoms is measured and reported as the silica particles content after sonication.

From the measured silica particles content levels before and after sonication, the percentage detachment upon sonication of the silica particles is calculated according to equation (A) below.

$$\text{Percentage detachment upon sonication of the silica particles (\%)}=(\text{Silica particles content before sonication}-\text{Silica particles content after sonication})/\text{Silica particles content before sonication}\times 100 \quad (A)$$

In order for the cellulosic particles to be more unlikely to aggregate, the percentage detachment upon sonication of the silica particles may be 1% or more and 40% or less, preferably 3% or more and 30% or less, more preferably 5% or more and 25% or less.

Cellulosic Particles Having a Coating Layer

The cellulosic particles according to this exemplary embodiment may be cellulosic particles each including a core particle containing cellulose as its base constituent and a coating layer covering the core particle and containing at least one selected from the group consisting of a polyamine compound, a wax, a linear-chain saturated fatty acid, a hydroxy fatty acid, and an amino acid compound (hereinafter also referred to as “cellulosic particles having a coating layer”).

Configuring the cellulosic particles according to this exemplary embodiment in this way may make it more likely that the cellulosic particles are superior in biodegradability and unlikely to aggregate. A possible reason is as follows.

A polyamine compound adheres to the surface of the cellulosic particles with its affinity for the hydroxyl groups in the cellulose, but does not cover the surface of the cellulosic particles completely; it leaves spaces in places in the coating layer. The surface of the cellulosic particles forms irregularities, the regions covered with the polyamine compound being protrusions and those not covered being depressions. A decrease in surface energy caused by these irregularities may tend to help further reduce the aggregation of the cellulosic particles. Although the biodegradability of polyamine compounds is inferior when compared with that of cellulose, furthermore, the superior biodegradability of the cellulose is probably not impaired because microorganisms can pass through the spaces in the coating layer on the surface; using a polyamine compound, therefore, may help achieve superior biodegradability.

Waxes and linear-chain saturated fatty acids are highly water-repellent in themselves; using a wax and/or a linear-chain saturated fatty acid, therefore, may tend to encourage the reduction of the aggregation of the cellulosic particles by increasing the repulsive force between surfaces of the cellulosic particles, and this effect may be significant in water and organic solvents in particular. These compounds, furthermore, have a strong tendency to self-aggregate and can undergo partial self-aggregation on the surface of the cellulosic particles, too; the wax and/or fatty acid, therefore, can fail to cover the surface completely, leaving gaps in the coating layer. The superior biodegradability of the cellulose is probably not impaired because microorganisms can pass through these gaps, and the covering compound(s) itself is also biodegradable; these may help the particles achieve overall superior biodegradability.

Hydroxy fatty acids are water-repellent in themselves like linear-chain saturated fatty acids and may help reduce the aggregation of the cellulosic particles. By virtue of having a hydroxyl group, furthermore, hydroxy fatty acids are superior in affinity for cellulose; the reduced aggregation may be maintained well, for example even if the cellulosic particles take strong impact. Hydroxy fatty acids easily self-aggregate and, therefore, can leave gaps in the coating layer like linear-chain saturated fatty acid with 14 or more and 22 or fewer carbon atoms (C14 to C22); by virtue of this, using a hydroxy fatty acid may help achieve superior biodegradability.

As for amino acid compounds, they have a strong tendency to form flat-shaped crystals after forming the coating layer; the shape of the resulting surface is even more irregular than that of cellulosic particles having a coating layer containing a polyamine compound, and this may help further reduce the aggregation of the cellulosic particles. Amino acid compounds, furthermore, create gaps between their crystals and, therefore, tend to leave gaps in the coating layer; by virtue of this, using an amino acid compound may help achieve superior biodegradability.

For this reason, presumably, it may be more likely that the cellulosic particles are superior in biodegradability and unlikely to aggregate.

Core Particle

The core particle contains cellulose as its base constituent.

The cellulose contained in the core particle has the same definition as the cellulose previously described herein; possible and preferred ranges of parameters are also the same as in the foregoing.

Coating Layer

The coating layer contains at least one selected from the group consisting of a polyamine compound, a wax, a linear-chain saturated fatty acid, a hydroxy fatty acid, and an amino acid compound.

Polyamine Compound

"Polyamine compound" is a generic term for aliphatic hydrocarbons having two or more primary amino groups.

Examples of polyamine compounds include a polyalkyleneimine, polyallylamine, polyvinylamine, and polylysine.

For improved biodegradability, the polyalkyleneimine may be a polyalkyleneimine including a repeat unit having a C1 to C6 (preferably C1 to C4, more preferably C1 or C2) alkylene group, preferably polyethyleneimine.

Examples of polyallylamines include homopolymers or copolymers of allylamine, allylamine amidosulfate, diallylamine, dimethylallylamine, etc.

Examples of polyvinylamines include products of alkali hydrolysis of poly(N-vinylformamide); a specific example is Mitsubishi Chemical's "PVAM-0595B."

The polylysine may be an extract from a natural source, may be a substance produced by a transformed microorganism, or may be a product of chemical synthesis.

The polyamine compound may be at least one selected from the group consisting of polyethyleneimine and polylysine.

Using at least one selected from the group consisting of polyethyleneimine and polylysine as polyamine compound(s) may make it more likely that the cellulosic particles are superior in biodegradability and unlikely to aggregate. A possible reason is as follows.

Polyethyleneimine and polylysine are able to adhere firmly to the cellulosic particles by virtue of their high cation density and functional groups that react with the hydroxyl groups in the cellulose. Their hydrocarbon chain, at the same time, takes up an appropriate relative area, so if they adhere to the surface of the cellulosic particles, the hydrocarbon chains tend to be exposed on the surface; the particles, therefore, become more unlikely to aggregate. Polyethyleneimine and polylysine, furthermore, are not dense but relatively loose in terms of structure, which means that they provide spaces for microorganisms to enter through and, therefore, may tend not to interfere with the superior biodegradability of the cellulose.

For this reason, presumably, it may be more likely that the cellulosic particles are superior in biodegradability and unlikely to aggregate.

The polyamine compound content may be 0.2% by mass or more and 2% by mass or less of the cellulosic particles as a whole.

Wax

Examples of waxes include fatty acid-containing vegetable oils, hydrocarbon waxes, and diesters.

Examples of fatty acid-containing vegetable oils include castor oil, paulownia oil, linseed oil, shortening, corn oil, soybean oil, sesame oil, rapeseed oil, sunflower oil, rice bran oil, camellia oil, coconut oil, palm oil, walnut oil, olive oil, peanut oil, almond oil, jojoba oil, cocoa butter, shea butter, neem oil, safflower oil, Japan wax, candelilla wax, rice bran wax, carnauba wax, and *Rosa damascena* flower wax.

Examples of hydrocarbon waxes include petroleum waxes (paraffin wax, microcrystalline wax, petrolatum wax, etc.) and synthetic hydrocarbon waxes (polyethylene wax, polypropylene wax, polybutene wax, Fischer-Tropsch wax, etc.).

Examples of diesters include diesters of dibasic acids, such as malic acid, glutaric acid, adipic acid, azelaic acid, sebacic acid, and dodecanedioic acid, and C10 to C25 alcohols.

The wax may be carnauba wax.

Using carnauba wax as a wax may make it more likely that the cellulosic particles are superior in biodegradability and unlikely to aggregate. A possible reason is as follows.

Rich in constituents having a water-repellent structure, such as free fatty acids and hydrocarbons, carnauba wax may help prevent the aggregation of the particles; carnauba wax, furthermore, adheres to the cellulosic particles because its constituents include free alcohols that form weak hydrogen bonds with hydroxyl groups of the cellulosic particles, but the adhesion is relatively weak, so there will be spaces at the interface between the surface of the cellulosic particles and the coating layer through which microorganisms can enter; carnauba wax, therefore, seems not to impair the superior biodegradability of the cellulose.

For this reason, presumably, it may be more likely that the cellulosic particles are superior in biodegradability and unlikely to aggregate.

The wax content may be 0.1% by mass or more and 2% by mass or less, preferably 0.2% by mass or more and 1% by mass or less, of the cellulosic particles as a whole.

Linear-Chain Saturated Fatty Acid

Linear-chain saturated fatty acids are saturated fatty acids in a linear-chain structure.

In order for the cellulosic particles to be better in biodegradability and more unlikely to aggregate, the linear-chain saturated fatty acid may be a C14 to C22 linear-chain saturated fatty acid.

Specific examples of C14 to C22 linear-chain saturated fatty acids include behenic acid, arachidic acid, and palmitic acid.

The reason why using a linear-chain saturated fatty acid in the coating layer may help prevent the aggregation of the cellulosic particles and achieve superior biodegradability appears to be as follows. The terminal carboxylic acid is able to adhere to the surface of the cellulosic particles by forming covalent bonds with, or by virtue of its ionic affinity for, hydroxyl groups in the cellulose. On the surface, linear-chain hydrocarbon groups are exposed, and these hydrocarbon groups may help prevent the aggregation of the particles by repelling each other. A porous portion in the coating layer is also created on the surface, because the hydrocarbon groups repel each other even on the surface of one single particle; since microorganisms can enter through spaces in this portion, the superior biodegradability of the cellulose is probably not impaired.

By making the number of carbon atoms in the linear-chain saturated fatty acid 14 or more, it may be made more certain that the prevention of aggregation and the biodegradability are both improved. By making the number of carbon atoms 22 or fewer, it may be made more certain that the prevention of aggregation is improved because in that case the adhesion of the fatty acid to the surface of the cellulosic particles may be enhanced by virtue of not too strong repulsion between hydrocarbon groups of the acid.

The linear-chain saturated fatty acid content may be 2% by mass or more and 15% by mass or less, preferably 5% by mass or more and 10% by mass or less, of the cellulosic particles as a whole.

Hydroxy Fatty Acid

Hydroxy fatty acids are fatty acids having a hydroxy group.

The hydroxy fatty acid may be a C12 to C20 hydroxy fatty acid.

Examples of hydroxy fatty acids include hydroxystearic acid, hydroxypalmitic acid, hydroxylauric acid, hydroxymyristic acid, and hydrogenated castor oil fatty acids.

The reason why using a hydroxy fatty acid in the coating layer may help prevent the aggregation of the cellulosic particles and achieve superior biodegradability appears to be as follows. The hydroxyl group in the hydroxy fatty acid forms weak hydrogen bonds with hydroxyl groups of the cellulosic particles, and this causes the hydroxy fatty acid to adhere to the surface of the cellulosic particles. The fatty acid moiety of the adhering hydroxy fatty acid faces toward the outside of the cellulosic particles; repulsion between molecules of the fatty acid at this moiety may reduce the aggregation of the cellulosic particles. Because of low affinity of the hydrocarbon moiety of the fatty acid for the cellulose, spaces are created therebetween through which microorganisms can penetrate into the cellulosic particles; the superior biodegradability of the cellulose, therefore, is probably not interfered with.

If the number of carbon atoms in the hydroxy fatty acid is 12 or more, the reduction of aggregation may tend to be improved because of a great repulsive force between molecules of the fatty acid. If the number of carbon atoms is 20 or fewer, the blockage of pathways for microorganisms to enter through caused by entanglement between long chains may be reduced; the associated decrease in biodegradability, therefore, may be reduced.

The hydroxy fatty acid content may be 1% by mass or more and 10% by mass or less, preferably 3% by mass or more and 10% by mass or less, of the cellulosic particles as a whole.

Amino Acid Compound

"Amino acid compounds" refers to amino acids and amino acid derivatives.

An amino acid derivative is a compound derived from an amino acid by replacing one or more hydrogen atoms or functional groups therein with another substituent.

The amino acid compound may be an amino acid derivative.

Examples of amino acid compounds include lauryl leucine, lauryl arginine, and myristyl leucine.

The reason why using an amino acid compound in the coating layer may help prevent the aggregation of the cellulosic particles and achieve superior biodegradability appears to be as follows. The amino acid compound adheres to the surface of the cellulosic particles by virtue of ionic affinity of its amide group for hydroxyl groups in the cellulose. On the surface of the cellulosic particles, the hydrocarbon moiety of the amino acid compound is exposed, and repulsion between molecules of the compound at this moiety may help reduce the aggregation of the cellulosic particles. The amino acid, furthermore, breaks down quickly by being attacked by microorganisms; biodegradability, therefore, may also be extremely good.

The amino acid compound content may be 2% by mass or more and 10% by mass or less of the cellulosic particles as a whole.

Layer Structure of the Coating Layer

The coating layer may have a first coating layer covering the core particle and containing at least one selected from the group consisting of a polyamine compound, polyvinyl alcohol, polyvinylpyrrolidone, a linear-chain saturated fatty acid, a hydroxy fatty acid, and an amino acid compound and a second coating layer covering the first coating layer and containing a wax.

In particular, the coating layer may have a first coating layer covering the core particle and containing at least one selected from the group consisting of a polyamine compound, a linear-chain saturated fatty acid, a hydroxy fatty acid, and an amino acid compound and a second coating layer covering the first coating layer and containing a wax.

The presence of such first and second coating layers in the coating layer may make it more likely that the cellulosic particles are superior in biodegradability and unlikely to aggregate. A possible reason is as follows.

Waxes are highly water-repellent and strongly repulsive, but their tendency to self-aggregate often results in the formation of large defects in the coating layer. If these defects are too large, the effectiveness of the wax in reducing the aggregation of the particles tends to be lower; coating the surface with a certain amount of wax may help prevent the formation of defects. Too much wax, however, tends to affect biodegradability. Polyamine compounds, linear-chain saturated fatty acids, hydroxy fatty acids, and amino acid compounds are inferior to waxes in the magnitude of the repulsive force they produce but adhere firmly to the cellulosic particles; these compounds, therefore, may form a coating layer with few defects therein. Polyamine compounds, linear-chain saturated fatty acids, hydroxy fatty acids, and amino acid compounds, furthermore, adhere firmly to waxes, and vice versa; using them, therefore, may help prevent the formation of defects in a wax coating. For this reason, the presence of first and second coating layers as described above in the coating layer may make it more likely that the cellulosic particles are superior in biodegradability and unlikely to aggregate.

By virtue of this, presumably, it may be more likely that the cellulosic particles are superior in biodegradability and unlikely to aggregate.

Polyvalent Metal Salt

The second coating layer may contain a polyvalent metal salt.

The presence of a polyvalent metal salt in the second coating layer may make it more likely that the cellulosic particles are superior in biodegradability and unlikely to aggregate. A possible reason is as follows.

The wax contained in the second layer adheres to the layer beneath it only weakly. The resulting coating, therefore, tends to have many defects as a result of the self-aggregation of the wax. A polyvalent metal salt contained in the second coating layer together with the wax spreads nearly uniformly throughout the wax and may provide starting points for the wax to aggregate nearly uniformly and extensively; the formation of coating defects due to the self-aggregation of the wax, therefore, may be reduced, and the adhesion of the second coating layer may be improved.

For this reason, presumably, it may be more likely that the cellulosic particles are superior in biodegradability and unlikely to aggregate.

Polyvalent metal salts are compounds formed by a divalent or higher-valency metal ion and an anion.

Examples of divalent or higher-valency metal ions as a component of a polyvalent metal salt include the ions of calcium, magnesium, copper, nickel, zinc, barium, aluminum, titanium, strontium, chromium, cobalt, iron, etc.

Examples of anions as a component of a polyvalent metal salt include inorganic or organic ions. Examples of inorganic ions include the chloride, bromide, iodide, nitrate, sulfate, and hydroxide ions. Examples of organic ions include organic acid ions, such as the carboxylate ion.

Examples of polyvalent metal salts include aluminum sulfate, polyaluminum chloride, iron chloride, and calcium hydroxide.

The polyvalent metal salt content relative to the wax content may be 0.1% by mass or more and 10% by mass or less, preferably 0.2% by mass or more and 5% by mass or less, more preferably 0.3% by mass or more and 1% by mass or less.

Amounts of Constituents in the First and Second Coating Layers

The polyamine compound content relative to the entire first coating layer may be 90% by mass or more and 100% by mass or less, preferably 95% by mass or more and 100% by mass or less.

The total amount of the wax and polyvalent metal salt relative to the entire second coating layer may be 90% by mass or more and 100% by mass or less, preferably 95% by mass or more and 100% by mass or less.

External Additive(s)

The cellulosic particles according to this exemplary embodiment may have at least one external additive selected from the group consisting of silicon-containing compound particles, metallic soap particles, fatty acid ester particles, and metal oxide particles.

In particular, the cellulosic particles according to this exemplary embodiment may have at least one external additive selected from the group consisting of silicon-containing compound particles and metallic soap particles.

The presence of such external additive(s) may make it more likely that the cellulosic particles according to this exemplary embodiment are superior in biodegradability and unlikely to aggregate. A possible reason is as follows.

Silicon-containing compound particles and metallic soap particles may further encourage the reduction of aggregation because they are able to adhere to particles larger than themselves (e.g., cellulosic particles) by electrostatic adhesion and are much more water-repellent than metal oxide particles and fatty acid ester particles. Particulate in shape, furthermore, silicon-containing compound particles and metallic soap particles have a larger specific surface area than the coating layer(s), and this shape effect may also enhance the reduction of aggregation. By virtue of their particulate shape, silicon-containing compound particles and metallic soap particles may provide sufficiently large spaces for microorganisms to enter through; these particles, therefore, probably do not interfere with the superior biodegradability of the cellulose either.

For this reason, presumably, it may be more likely that the cellulosic particles are superior in biodegradability and unlikely to aggregate.

"Silicon-containing compound particles" refers to particles containing silicon.

The silicon-containing compound particles may be particles of silicon or may be particles containing silicon and other element(s).

The silicon-containing compound particles may be silica particles.

The silica particles can be any silica-based, or $SiO_2$-based, particles, whether crystalline or amorphous. The silica particles, furthermore, may be particles produced from a raw-material silicon compound, such as waterglass or an alkoxysilane, or may be particles obtained by crushing quartz.

Using silica particles as silicon-containing compound particles may make it more likely that the cellulosic particles are superior in biodegradability and unlikely to aggregate. A possible reason is as follows.

Silica may be particularly effective in reducing aggregation because its particles tend to have a high sphericity and by virtue of high water repellency of the element silicon. Particulate in shape, furthermore, silica particles may provide sufficiently large spaces for microorganisms to enter through; this may ensure that microorganisms will be uniformly distributed when attacking the particles, and, as a result, the cellulosic particles may be superb in biodegradability, too.

For this reason, presumably, it may be more likely that the cellulosic particles are superior in biodegradability and unlikely to aggregate.

Metallic soap particles are metallic soap-based particles.

In this context, "metallic soap-based particles" refers to particles containing 90% by mass or more metallic soap in relation to the particles themselves.

A metallic soap is a metallic salt of a fatty acid, formed by a fatty acid and a metal bound together.

An example of a metallic salt of a fatty acid is a metallic salt of a C10 to C25 (preferably C12 to C22) fatty acid. Examples of metallic salts of C10 to C25 fatty acids include metallic salts of stearic acid, palmitic acid, lauric acid, oleic acid, linoleic acid, and ricinoleic acid.

An example of a metal in a metallic salt of a fatty acid is a divalent metal.

Examples of metals in metallic salts of fatty acids include magnesium, calcium, aluminum, barium, and zinc.

Fatty acid ester particles are particles including fatty acid ester particles as a base component.

In this context, "particles including fatty acid ester particles as a base component" refers to particles including 90% by mass or more fatty acid ester particles in relation to the particles themselves.

An example of a fatty acid ester is the product of esterification between a C10 to C25 saturated fatty acid and a C10 to C25 alcohol.

Examples of fatty acid esters include stearyl stearate, stearyl laurate, and stearyl palmitate.

Metal oxide particles are metal oxide-based particles.

In this context, "metal oxide-based particles" refers to particles containing 90% by mass or more metal oxide in relation to the particles themselves.

The metal oxide can be an oxide of a metal other than silicon.

Examples of metal oxides include zinc oxide, magnesium oxide, iron oxide, aluminum oxide, and calcium oxide.

The amount of the external additive may be 0.1% by mass or more and 2% by mass or less of the mass of the cellulosic particles (cellulosic particles to which the external additive has yet to be added) as a whole.

Volume-Average Particle Diameter and Upper Geometric Standard Deviation by Number GSDv The volume-average particle diameter of the cellulosic particles according to this exemplary embodiment may be 3 μm or more and less than 10 μm, preferably 4 μm or more and 9 μm or less, more preferably 5 μm or more and 8 μm or less.

Making the volume-average particle diameter of the cellulosic particles according to this exemplary embodiment 3 μm or more and less than 10 μm may make it more likely that the cellulosic particles are superior in biodegradability and unlikely to aggregate. A possible reason is as follows.

If the volume-average particle diameter of the cellulosic particles is 3 μm or more, the surface area of the cellulosic particles is not too large, and the repulsive force between the particles may also be maintained; the aggregation of the cellulosic particles, therefore, may be reduced more effectively. If the volume-average particle diameter of the cellulosic particles is less than 10 μm, furthermore, the degradation process, which starts at the surface, tends to proceed uniformly by virtue of a moderately large surface area of the cellulosic particles; the cellulosic particles, therefore, may tend to be superior in biodegradability.

For this reason, presumably, it may be more likely that the cellulosic particles are superior in biodegradability and unlikely to aggregate.

The upper geometric standard deviation by number GSDv of the cellulosic particles according to this exemplary embodiment may be 1.0 or greater and 1.7 or less, preferably 1.0 or greater and 1.5 or less, more preferably 1.0 or greater and 1.3 or less.

Making the upper geometric standard deviation by number GSDv of the cellulosic particles according to this exemplary embodiment 1.0 or greater and 1.7 or less may make it more likely that the cellulosic particles are superior in biodegradability and unlikely to aggregate. A possible reason is as follows.

If the GSDv is 1.0 or greater and 1.7 or less, the aggregation of the cellulosic particles caused by fine particles (small cellulosic particles, with volume-average particle diameters smaller than 3 μm) may be unlikely to occur because such fine particles are scarce; superior biodegradability, furthermore, may tend to be achieved because the inhibition of the biodegradation process by coarse particles (large cellulosic particles, with volume-average particle diameters exceeding 10 μm) may be less likely to occur (because the cellulosic particles break down at their surface first, large-sized cellulosic particles tend to be inferior in biodegradability).

For this reason, presumably, it may be more likely that the cellulosic particles are superior in biodegradability and unlikely to aggregate.

The volume-average particle diameter and the upper geometric standard deviation GSDp of the cellulosic particles are measured as follows.

Particle diameters are measured using the LS particle size distribution analyzer "Beckman Coulter LS13 320 (Beckman Coulter)," and the cumulative distribution of particle diameters is plotted as a function of volume starting from the smallest diameter; then the particle diameter at which the cumulative percentage is 50% is determined as the volume-average particle diameter.

Separately, the cumulative distribution of particle diameters is plotted as a function of volume starting from the smallest diameter, and the particle diameters at which the cumulative percentage is 50% and 84% are defined as the number-average particle diameter, D50v, and particle diameter D84v by number, respectively. The upper geometric standard deviation by number GSDv is calculated according to the equation $GSDv=(D84v/D50v)^{1/2}$.

Sphericity

The sphericity of the cellulosic particles according to this exemplary embodiment may be 0.90 or greater, preferably 0.95 or greater, more preferably 0.97 or greater.

Making the sphericity of the cellulosic particles according to this exemplary embodiment 0.90 or greater may make it more likely that the cellulosic particles are superior in biodegradability and unlikely to aggregate. A possible reason is as follows.

If the sphericity is 0.90 or greater, an increase in potential area of contact caused by anisotropy may be prevented; the aggregation of the cellulosic particles, therefore, may tend to be reduced more effectively. In that case, furthermore, the distance from the surface to the inner core of the particles, for which microorganisms need to go to decompose the particles, may be the shortest; biodegradability, therefore, may tend to be excellent.

For this reason, presumably, it may be more likely that the cellulosic particles are superior in biodegradability and unlikely to aggregate.

The sphericity is given by (circumference of the equivalent circle)/(circumference) [(circumference of a circle having the same projected area as the particle's image)/(circumference of the particle's projected image)]. Specifically, the sphericity is a value measured by the following method.

First, a portion of the cellulosic particles of interest is collected by aspiration in such a manner that it will form a flat stream, and this flat stream is photographed with a flash to capture the figures of the particles in a still image; then the particle images obtained are analyzed using a flow particle-image analyzer (Sysmex Corp. FPIA-3000) to give the sphericity. The number of particles sampled in the determination of the sphericity is 3500.

If the cellulosic particles have an external additive, the cellulosic particles of interest are dispersed in water containing a surfactant and then sonicated to eliminate the external additive, and the sonicated particles are subjected to the measurement.

Surface Smoothness

The surface smoothness of the cellulosic particles according to this exemplary embodiment may be 80% or higher, preferably 82% or higher and 99% or lower, more preferably 84% or higher and 98% or lower.

Making the surface smoothness of the cellulosic particles according to this exemplary embodiment 80% or higher may tend to make the cellulosic particles better in biodegradability and more unlikely to aggregate. A possible reason is as follows.

If the surface smoothness is 80% or higher, the aggregation of the cellulosic particles may tend to be reduced by virtue of a relatively small specific surface area of the cellulosic particles. In that case, furthermore, the cellulosic particles may tend to be superior in biodegradability; some biodegrading microorganisms are relatively large in size, and, if the surface smoothness is 80% or higher, such large-sized microorganisms can get access to the particle surface.

For this reason, presumably, the cellulosic particles may tend to be better in biodegradability and more unlikely to aggregate.

The surface smoothness is measured through a procedure as described below.

An SEM image (magnification, 5,000 times) of the cellulosic particles, taken with a scanning electron microscope (SEM), is observed, and the smoothness M of the individual cellulosic particles is calculated according to the equation below. Then the arithmetic mean smoothness M of any ten or more cellulosic particles is reported as the surface smoothness. The closer the smoothness M is to 1, the closer the surface of the cellulosic particles is to smoothness.

$$M=(1-(S3)/(S2))\times 100$$

In this equation, S2 denotes the area of the cellulosic particle in the image (projected area), and S3 denotes, when the cellulosic particle in the image is superimposed on a circle having a projected area equal to S2, the sum of "the area outside the outline of the circle having a projected area equal to S2 and inside the outline of the cellulosic particle in the image" and "the area inside the outline of the circle having a projected area equal to S2 and outside the outline of the cellulosic particle in the image."

The method for superimposing the cellulosic particle in the image on a circle having a projected area equal to S2 is as follows.

The cellulosic particle in the image is superimposed on the circle having a projected area equal to S2 so that the area of overlap between the two images (the area inside the outline of the circle having a projected area equal to S2 and inside the outline of the cellulosic particle in the image) will be maximized.

Method for Producing the Cellulosic Particles

A method for producing the cellulosic particles may include a step of producing a particle precursor containing a cellulose acylate (particle precursor production step) and a step of saponifying the cellulose acylate contained in the particle precursor (saponification step).

Particle Precursor Production Step

A particle precursor containing a cellulose acylate is produced by any of methods (1) to (5) below.

(1) Kneading and milling, in which the ingredients are kneaded together, and the resulting mixture is milled and classified to give grains
(2) A dry process, in which the shape of the grains obtained by kneading and milling is changed with the help of a mechanical impact force or thermal energy
(3) Aggregation and coalescence, in which particle dispersions of the ingredients are mixed together, and the particles in the mixed dispersion are caused to aggregate and fused together under heat to give grains
(4) Dissolution and suspension, in which a solution of the ingredients in an organic solvent is suspended in an aqueous medium to form grains containing the ingredients
(5) Kneading and dissolution, in which the ingredients and a binder are kneaded together, the resulting mixture is pelletized by extrusion, and the resulting pellets are stirred in a solvent for the binder to form grains In this context, a cellulose acylate is a cellulose derivative in which at least one of the hydroxy groups in cellulose has been replaced with an aliphatic acyl group (acylated). Specifically, a cellulose acylate is a cellulose derivative in which at least one of the hydroxy groups in cellulose has been replaced with —CO—$R^{AC}$ ($R^{AC}$ represents an aliphatic hydrocarbon group.).

Saponification Step

Then the cellulose acylate contained in the particle precursor is saponified.

Through this step, the aliphatic acyl group(s) in the cellulose acylate is hydrolyzed, and the cellulose turns into cellulose.

The saponification step is performed by, for example, adding sodium hydroxide to a dispersion of the particle precursor and stirring the dispersion.

Coating Layer Formation Step

If cellulosic particles having a coating layer are produced, the production method may include a step of forming the coating layer (coating layer formation step) after the above saponification step.

If the coating layer formation step is performed, the coating layer is formed using the particles obtained through the above saponification step as core particles.

First, an aqueous dispersion in which the core particles are dispersed is prepared. The core particles may be cleaned with acid before the preparation of the aqueous dispersion.

Then the aqueous dispersion in which the core particles are dispersed is mixed with an aqueous solution containing the compound(s) that will form the first coating layer. This causes, for example, hydroxyl groups in the resin contained in the core particles to react, for example with the amine sites or carboxylic acid sites in the surface-treating polymer(s), to form the first coating layer. Then the aqueous dispersion in which the core particles with the first coating layer formed thereon are dispersed is mixed with an emulsion containing the compound(s) that will form the second coating layer. Through this, the second coating layer is formed.

Then the cellulosic particles having coating layers are removed from the mixture. The removal of the cellulosic particles having coating layers is done by, for example, filtering the mixture. The removed cellulosic particles having coating layers may be washed with water. This may help eliminate unreacted residue of the surface-treating polymer(s). Then the cellulosic particles having coating layers are dried, giving cellulosic particles according to this exemplary embodiment.

Addition Step

External additive(s) may be added to the resulting cellulosic particles.

An example of an addition step is a treatment in which the external additive(s) is added to the cellulosic particles using equipment like a mixing mill, V-blender, Henschel mixer, or Lödige mixer.

Applications

Applications of the cellulosic particles according to this exemplary embodiment include grains for use as cosmetics, a rolling agent, an abrasive, a scrubbing agent, display spacers, a material for bead molding, light-diffusing particles, a resin-strengthening agent, a refractive index control agent, a biodegradation accelerator, a fertilizer, water-absorbent particles, toner particles, and anti-blocking particles.

An application of the cellulosic particles according to this exemplary embodiment may be cosmetics.

An application of the cellulosic particles according to this exemplary embodiment may be a cosmetic additive in particular.

Potentially superior in flexibility, the cellulosic particles according to this exemplary embodiment, if used as a cosmetic additive, may help the cosmetic product to spread well on the skin when the cosmetic product is put on the skin.

The cellulosic particles according to this exemplary embodiment can be applied as cosmetic additives, for example to base makeup cosmetics (e.g., foundation primer, concealer, foundation, and face powder); makeup cosmetics (e.g., lipstick, lip gloss, lip liner, blush, eye shadow, eyeliner, mascara, eyebrow powder, nail products, and nail care cosmetics); and skincare cosmetics (e.g., face wash, facial cleanser, toner, milky lotion, serum, face packs, face masks, and cosmetics for the care of the eye and mouth areas).

The resin particles according to this exemplary embodiment may be used as a cosmetic additive to makeup cosmetics in particular, because cosmetic additives to makeup cosmetics can need to be flexible and biodegradable.

EXAMPLES

Examples will now be described, but no aspect of the present disclosure is limited to these examples. In the following description, "parts" and "%" are all by mass unless stated otherwise.

Preparation of Materials

The following materials are prepared.

Cellulose Acylates

Cell1: Daicel "L-20"; cellulose acetate; number-average molecular weight, 47000.

Cel2: Daicel "L-50"; cellulose acetate; number-average molecular weight, 58000.

Cel3: Eastman Chemical "CAP482-20"; cellulose acetate propionate; number-average molecular weight, 75000.

Cel4: Eastman Chemical "CAB381-20"; cellulose acetate butyrate; number-average molecular weight, 70000.

Cel5: Eastman Chemical "CA398-6"; cellulose acetate; number-average molecular weight, 35000.

Cel6: Eastman Chemical "CAP482-0.5"; cellulose acetate propionate; number-average molecular weight, 25000.

Cel7: Eastman Chemical "CAP-504-0.2"; cellulose acetate propionate; number-average molecular weight, 15000.

Compounds for the First Coating Layer

Polyamine Compounds

Fir1: Nippon Shokubai "EPOMIN SP-003"; polyethyleneimine; molecular weight, 300

Fir2: Nippon Shokubai "EPOMIN SP-006"; polyethyleneimine; molecular weight, 600

Fir3: Nippon Shokubai "EPOMIN SP-012"; polyethyleneimine; molecular weight, 1200

Fir4: Nippon Shokubai "EPOMIN SP-018"; polyethyleneimine; molecular weight, 1800

Fir5: Nippon Shokubai "EPOMIN SP-200"; polyethyleneimine; molecular weight, 1000

Fir6: Nippon Shokubai "EPOMIN HM-2000"; polyethyleneimine; molecular weight, 30000

Fir7: Nippon Shokubai "EPOMIN P-1000"; polyethyleneimine; molecular weight, 70000

Fir8: Nittobo Medical "PAA-01"; polyallylamine; molecular weight, 1600

Fir9: Nittobo Medical "PAA-03"; polyallylamine; molecular weight, 3000

Fir10: Nittobo Medical "PAA-05"; polyallylamine; molecular weight, 5000

Fir11: Nittobo Medical "PAA-08"; polyallylamine; molecular weight, 8000

Fir12: Nittobo Medical "PAA-15C"; polyallylamine; molecular weight, 15000

Fir13: Nittobo Medical "PAA-25"; polyallylamine; molecular weight, 25000

Fir14: Mitsubishi Chemical "GOHSENOL N-300," polyvinyl alcohol

Fir15: JNC "Polylysine 10," polylysine

Fir16: Ichimaru Pharcos "Polylysine 10," polylysine

Linear-Chain Saturated Fatty Acids

Fir19: NOF "NAA-2225," behenic acid (C22)

Fir20: FUJIFILM Wako Pure Chemical, arachidic acid (C20)

Fir21: FUJIFILM Wako Pure Chemical, palmitic acid (C14)

Fir22: FUJIFILM Wako Pure Chemical, lauric acid (C12)

Fir23: FUJIFILM Wako Pure Chemical, lignoceric acid (C24)

Hydroxy Fatty Acids

Fir24: Itoh Oil Chemicals "12-Hydroxystearic Acid," hydroxystearic acid

Fir25: NOF, a hydrogenated castor oil fatty acid

Amino Acid Compound

Fir26: Ajinomoto "AMIHOPE LL," lauroyl lysine

Polyvinyl Alcohol and Polyvinylpyrrolidone

Fir17: Mitsubishi Chemical "GOHSENOL N-300," polyvinyl alcohol

Fir18: Nippon Shokubai "K-30," polyvinylpyrrolidone

Compounds for the Second Coating Layer

Waxes

Sec1: Senka "CN-100," carnauba wax

Sec2: Toa Kasei "TOWAX-1F3," carnauba wax

Sec3: Toa Kasei "TOWAX-1F6," carnauba wax

Sec4: Toa Kasei "TOWAX-1F8," carnauba wax

Sec5: Toa Kasei "TOWAX-1F12," carnauba wax

Sec6: Toa Kasei "TOWAX-5B2," carnauba wax

Sec7: Toa Kasei "TOWAX-1B4," carnauba wax

Sec8: Toa Kasei "TOWAX-4F2," candelilla wax

Sec9: Toa Kasei "TOWAX-4F3," candelilla wax

Sec10: Toa Kasei "TOWAX-4F4," candelilla wax

Sec11: Toa Kasei "TOWAX-6B2," *Rosa damascena* flower wax

Sec12: Toa Kasei "TOWAX-6F2," sunflower seed wax

Sec13: Kokura Gosei Kogyo, rice bran wax

Sec14: Boso Oil and Fat "SS-1," rice bran wax

Sec15: Nisshin OilliO "COSMOL 222," diisostearyl malate

Polyvalent Metal Salts

Sec21: FUJIFILM Wako Pure Chemical, aluminum sulfate

Sec22: FUJIFILM Wako Pure Chemical, polyaluminum chloride

Sec23: FUJIFILM Wako Pure Chemical, iron chloride

Sec24: FUJIFILM Wako Pure Chemical, calcium hydroxide

External Additives

Silicon-Containing Compound Particles

Sur1: Nippon Aerosil "AEROSIL R972," silica dimethyl silylate particles

Sur2: Nippon Aerosil "AEROSIL RY200S," silica dimethicone silylate particles

Metallic Soap Particles

Sur3: NOF "MZ-2," zinc stearate particles

Sur4: NOF "Magnesium Stearate S," magnesium stearate particles

Fatty Acid Ester Particles

Sur6: Kao "EXCEPARL SS," stearyl stearate particles

Metal Oxide Particles

Sur7: Sakai Chemical "FINEX-50," zinc oxide particles

Example 1

Particle Precursor Production Step

As a cellulose acylate, 130 parts of Cel1 is dissolved completely in 870 parts of ethyl acetate. The resulting solution is added to a water-based liquid containing 45 parts of calcium carbonate and 500 parts of purified water, and the resulting mixture is stirred for 5 hours (hereinafter referred to as "the first stirring time"). A dispersion of 5 parts of carboxymethyl cellulose (hereinafter also referred to as "CMC") and 200 parts of methyl ethyl ketone in 600 parts of purified water is added, and the resulting mixture is stirred for 5 minutes using a high-speed emulsifier. Ten parts of sodium hydroxide is added, and the resulting mixture is heated to 80° C. and stirred for 3 hours to eliminate the ethyl acetate and the methyl ethyl ketone. The same amount of diluted hydrochloric acid as the sodium hydroxide is added, the residue is collected by filtration, and the collected solids are dispersed once again in purified water to give a particle precursor dispersion (solids concentration, 10%).

Saponification Step

A mixture obtained by adding 17.5 parts of a 20% aqueous solution of sodium hydroxide to 500 parts of the particle precursor dispersion is stirred for 6 hours at a saponification temperature of 30° C. After the pH is adjusted to 7 with hydrochloric acid, the saponified slurry is cleaned by repeated filtration and washing until the electrical conductivity of the filtrate is 10 μs/cm or less, yielding cellulosic particles.

Examples 2 to 7

Cellulosic particles are obtained through the same procedure as in Example 1, except that in the particle precursor production step, the cellulose acylate species is as in Table 1.

Example 8

Particle Precursor Production Step and Saponification Step

Cellulosic particles are obtained through the same procedure as in Example 1.

Coating Layer Formation Step

One thousand parts of the cellulosic particles, which are core particles, and 10000 parts of deionized water are mixed together to give a core particle dispersion. Five parts of Fir16 as a compound that will form the first coating layer is added to the core particle dispersion, and the resulting mixture is stirred for 1 hour to make the compound form a coating layer. The cellulosic particles having a coating layer are cleaned by repeated filtration and washing until the electrical conductivity of the filtrate is 10 μs/cm or less, yielding cellulosic particles having a coating layer.

Examples 9 to 25

Cellulosic particles having a coating layer are obtained through the same procedure as in Example 8, except that in the coating layer formation step, the species of the compound that will form the first coating layer ("First-layer compound" in Table 1) is as in Table 1.

Example 26

Particle Precursor Production Step and Saponification Step

Cellulosic particles are obtained through the same procedure as in Example 1.

Coating Layer Formation Step

One thousand parts of the cellulosic particles, which are core particles, and 10000 parts of deionized water are mixed together to give a core particle dispersion. Seven parts of Fir16 as a compound that will form the first coating layer is added to the core particle dispersion, and the resulting mixture is stirred for 1 hour to make the compound form a first coating layer, yielding a dispersion of cellulosic particles having a first coating layer.

Subsequently, an emulsion for the formation of the second coating layer is prepared by stirring 6 parts of Sec1 as a wax and 50 parts of purified water using a high-speed emulsifier.

All of the emulsion for the formation of the second coating layer is added to the dispersion of cellulosic particles having a first coating layer, and the resulting mixture is stirred for 24 hours to make the wax form the second coating layer, yielding a dispersion of cellulosic particles having first and second coating layers.

The cellulosic particles having first and second coating layers are cleaned by repeated filtration and washing until the electrical conductivity of the filtrate is 10 μs/cm or less, yielding cellulosic particles having first and second coating layers.

Examples 27 to 40

Cellulosic particles having first and second coating layers are obtained through the same procedure as in Example 26, except that in the coating layer formation step, the wax species is as in Table 1.

Examples 41 to 43

Cellulosic particles having first and second coating layers are obtained through the same procedure as in Example 26, except that in the coating layer formation step, the amount of the compound that will form the first coating layer and the amount of wax are as in Table 1.

Example 44

Particle Precursor Production Step, Saponification Step, and Coating Layer Formation Step Cellulosic particles having first and second coating layers are obtained through the same procedure as in Example 26.

Addition Step

As an external additive, 0.6 parts of Sur1 is added to 30 parts of the cellulosic particles having first and second coating layers, and the ingredients are mixed together in a mixing mill (WONDER CRUSHER, Osaka Chemical) to give cellulosic particles having an external additive.

Examples 45 to 51

Cellulosic particles having an external additive are obtained through the same procedure as in Example 44, except that in the addition step, the external additive and its amount are as in Table 1.

Examples 52 to 59

Cellulosic particles having an external additive are obtained through the same procedure as in Example 26, except that in the particle precursor production step, the amount of calcium carbonate, the first stirring time, the amount of carboxymethyl cellulose, and the amount of sodium hydroxide are as in Table 1.

Example 60

Cellulosic particles having a coating layer are obtained through the same procedure as in Example 26, except that the coating layer formation step is done without the process of adding 5 parts of Fir16 as a compound that will form the first coating layer to the core particle dispersion and stirring the resulting mixture for 1 hour.

Examples 61 to 64

Cellulosic particles having an external additive are obtained through the same procedure as in Example 44, except that in the coating layer formation step, the wax species is changed as in Table 1 and that in preparing the emulsion for the formation of the second coating layer, the polyvalent metal salt specified in Table 1, its amount being as in Table 1, is added together with the wax and the purified water.

Examples 65 to 74

Cellulosic particles having a coating layer are obtained through the same procedure as in Example 8, except that in the coating layer formation step, the compound that will form the first coating layer ("First-layer compound" in Table 1) and its amount are as in Table 1.

Example 75

Cellulosic particles having first and second coating layers are obtained through the same procedure as in Example 26, except that in the coating layer formation step, the compound that will form the first coating layer and its amount and the amount of wax are as in Table 1.

Example 76

Cellulosic particles having first and second coating layers are obtained through the same procedure as in Example 75, except that in preparing the emulsion for the formation of the second coating layer in the coating layer formation step, the polyvalent metal salt specified in Table 1, its amount being as in Table 1, is added together with the wax and the purified water.

Example 77

Particle Precursor Production Step, Saponification Step, and Coating Layer Formation Step Cellulosic particles having first and second coating layers are obtained through the same procedure as in Example 76.

Addition Step

As an external additive, 0.6 parts of Sur1 is added to 30 parts of the cellulosic particles having first and second coating layers, and the ingredients are mixed together in a mixing mill (WONDER CRUSHER, Osaka Chemical) to give cellulosic particles having an external additive.

Comparative Examples 1 to 4

The following particles are used as the cellulosic particles of each example.

Comparative Example 1: CELLULOBEADS D10 (Daito Kasei, cellulose-based cellulosic particles. No coating layer and no external additive.)

Comparative Example 2: OTS-0.5A CELLULOBEADS D10 (Daito Kasei, cellulosic particles having a cellulose-based core particle and a coating layer containing triethoxyoctylsilane. No external additive.)

Comparative Example 3: S-STM CELLULOBEADS D-5 (Daito Kasei, cellulosic particles having a cellulose-based core particle and a coating layer containing magnesium stearate. No external additive.)

Comparative Example 4: CELLUFLOW C25 (JNC, cellulose-based cellulosic particles. No coating layer and no external additive.)

Comparative Examples 5 to 8

The cellulosic particles of each example are obtained according to the following procedures.

Comparative Example 5: Cellulosic particles are obtained according to the procedure described in Example 1 in Japanese Patent No. 6872068. These cellulosic particles have a cellulose-based core particle and a coating layer containing zinc stearate and have no external additive.

Comparative Example 6: Cellulosic particles are obtained according to the procedure described in Example 2 in Japanese Patent No. 6872068. These cellulosic particles have a cellulose-based core particle and a coating layer containing magnesium stearate and have no external additive.

Comparative Example 7: Cellulosic particles are obtained according to the procedure described in Example 1 in Japanese Unexamined Patent Application Publication No. 2021-021044. These cellulosic particles are cellulose-based ones and have no coating layer and no external additive.

Comparative Example 8: Cellulosic particles are obtained according to the procedure described in Example 1 in Japanese Unexamined Patent Application Publication No. 2021-021045. These cellulosic particles are cellulose-based ones and have no coating layer and no external additive.

Evaluations

Biodegradability and aggregation evaluations are carried out using the cellulosic particles obtained in each example or comparative example.

Biodegradability

Percentage biodegradation after 60 days is measured and calculated as per JIS K6950:2000 (ISO 14851:1999).

Degree of Aggregation

The dispersion of the cellulosic particles is evaluated after treating the cellulosic particles in the state of powder (hereinafter referred to as "as powder"), those allowed to present in water (hereinafter referred to as "in water"), and those allowed to present in an organic solvent (hereinafter referred to as "in oil") under the conditions below for the specified period of time.

Specifically, the volume-average particle diameter of the cellulosic particles is measured before and after treatment of the cellulosic particles under the conditions below, and the degree of aggregation is calculated according to equation (B) below. The measurement of the volume-average particle diameter of the cellulosic particles is done according to the method previously described herein.

$$\text{Degree of aggregation}=(\text{Volume-average particle diameter of the cellulosic particles after the treatment below})/(\text{Volume-average particle diameter of the cellulosic particles before the treatment below}) \tag{B}$$

Treatment as Powder

The cellulosic particles of the example or comparative example are left under hot and humid conditions of a temperature of 50° C. and a relative humidity of 80% for 72 hours.

Treatment in Water

The cellulosic particles of the example or comparative example are stirred in water at a temperature of 50° C. for 48 hours.

Treatment in Oil

The cellulosic particles of the example or comparative example are stirred in isopropyl alcohol at a temperature of 40° C. for 48 hours.

TABLE 1

| | | Particle precursor production step | | | | | Coating layer formation step | | | | | | Addition step | |
|---|---|---|---|---|---|---|---|---|---|---|---|---|---|---|
| | | | | | | | First-layer compound | | Wax | | Polyvalent metal salt | | External additive | |
| | Particle number | Cellulose acylate species | Amount of calcium carbonate (parts) | First stirring time (hr) | Amount of CMC (parts) | Amount of sodium hydroxide (parts) | Species | Amount (parts) | Species | Amount (parts) | Species | Amount (parts) | Species | Amount (parts) |
| Example 1 | Par501 | Cel1 | 45 | 5 | 5 | 10 | | | | | | | | |
| Example 2 | Par502 | Cel2 | 45 | 5 | 5 | 10 | | | | | | | | |
| Example 3 | Par503 | Cel3 | 45 | 5 | 5 | 10 | | | | | | | | |

TABLE 1-continued

| | | Particle precursor production step | | | | | Coating layer formation step | | | | | | Addition step | |
|---|---|---|---|---|---|---|---|---|---|---|---|---|---|---|
| | | | | | | | First-layer compound | | Wax | | Polyvalent metal salt | | External additive | |
| | Particle number | Cellulose acylate species | Amount of calcium carbonate (parts) | First stirring time (hr) | Amount of CMC (parts) | Amount of sodium hydroxide (parts) | Species | Amount (parts) | Species | Amount (parts) | Species | Amount (parts) | Species | Amount (parts) |
| Example 4 | Par504 | Cel4 | 45 | 5 | 5 | 10 | | | | | | | | |
| Example 5 | Par505 | Cel5 | 45 | 5 | 5 | 10 | | | | | | | | |
| Example 6 | Par506 | Cel6 | 45 | 5 | 5 | 10 | | | | | | | | |
| Example 7 | Par507 | Cel7 | 45 | 5 | 5 | 10 | | | | | | | | |
| Example 8 | Par508 | Cel1 | 45 | 5 | 5 | 10 | Fir16 | 5 | | | | | | |
| Example 9 | Par509 | Cel1 | 45 | 5 | 5 | 10 | Fir1 | 5 | | | | | | |
| Example 10 | Par510 | Cel1 | 45 | 5 | 5 | 10 | Fir2 | 5 | | | | | | |
| Example 11 | Par511 | Cel1 | 45 | 5 | 5 | 10 | Fir3 | 5 | | | | | | |
| Example 12 | Par512 | Cel1 | 45 | 5 | 5 | 10 | Fir4 | 5 | | | | | | |
| Example 13 | Par513 | Cel1 | 45 | 5 | 5 | 10 | Fir5 | 5 | | | | | | |
| Example 14 | Par514 | Cel1 | 45 | 5 | 5 | 10 | Fir6 | 5 | | | | | | |
| Example 15 | Par515 | Cel1 | 45 | 5 | 5 | 10 | Fir7 | 5 | | | | | | |
| Example 16 | Par516 | Cel1 | 45 | 5 | 5 | 10 | Fir8 | 5 | | | | | | |
| Example 17 | Par517 | Cel1 | 45 | 5 | 5 | 10 | Fir9 | 5 | | | | | | |
| Example 18 | Par518 | Cel1 | 45 | 5 | 5 | 10 | Fir10 | 5 | | | | | | |
| Example 19 | Par519 | Cel1 | 45 | 5 | 5 | 10 | Fir11 | 5 | | | | | | |
| Example 20 | Par520 | Cel1 | 45 | 5 | 5 | 10 | Fir12 | 5 | | | | | | |
| Example 21 | Par521 | Cel1 | 45 | 5 | 5 | 10 | Fir13 | 5 | | | | | | |
| Example 22 | Par522 | Cel1 | 45 | 5 | 5 | 10 | Fir14 | 5 | | | | | | |
| Example 23 | Par523 | Cel1 | 45 | 5 | 5 | 10 | Fir15 | 5 | | | | | | |
| Example 24 | Par524 | Cel1 | 45 | 5 | 5 | 10 | Fir17 | 5 | | | | | | |
| Example 25 | Par525 | Cel1 | 45 | 5 | 5 | 10 | Fir18 | 5 | | | | | | |
| Example 26 | Par526 | Cel1 | 45 | 5 | 5 | 10 | Fir16 | 7 | Sec1 | 6 | | | | |
| Example 27 | Par528 | Cel1 | 45 | 5 | 5 | 10 | Fir16 | 7 | Sec2 | 6 | | | | |
| Example 28 | Par529 | Cel1 | 45 | 5 | 5 | 10 | Fir16 | 7 | Sec3 | 6 | | | | |
| Example 29 | Par530 | Cel1 | 45 | 5 | 5 | 10 | Fir16 | 7 | Sec4 | 6 | | | | |
| Example 30 | Par531 | Cel1 | 45 | 5 | 5 | 10 | Fir16 | 7 | Sec5 | 6 | | | | |
| Example 31 | Par532 | Cel1 | 45 | 5 | 5 | 10 | Fir16 | 7 | Sec6 | 6 | | | | |
| Example 32 | Par533 | Cel1 | 45 | 5 | 5 | 10 | Fir16 | 7 | Sec7 | 6 | | | | |
| Example 33 | Par534 | Cel1 | 45 | 5 | 5 | 10 | Fir16 | 7 | Sec8 | 6 | | | | |
| Example 34 | Par535 | Cel1 | 45 | 5 | 5 | 10 | Fir16 | 7 | Sec9 | 6 | | | | |
| Example 35 | Par536 | Cel1 | 45 | 5 | 5 | 10 | Fir16 | 7 | Sec10 | 6 | | | | |
| Example 36 | Par537 | Cel1 | 45 | 5 | 5 | 10 | Fir16 | 7 | Sec11 | 6 | | | | |
| Example 37 | Par538 | Cel1 | 45 | 5 | 5 | 10 | Fir16 | 7 | Sec12 | 6 | | | | |
| Example 38 | Par539 | Cel1 | 45 | 5 | 5 | 10 | Fir16 | 7 | Sec13 | 6 | | | | |
| Example 39 | Par540 | Cel1 | 45 | 5 | 5 | 10 | Fir16 | 7 | Sec14 | 6 | | | | |
| Example 40 | Par541 | Cel1 | 45 | 5 | 5 | 10 | Fir16 | 7 | Sec15 | 6 | | | | |
| Example 41 | Par542 | Cel1 | 45 | 5 | 5 | 10 | Fir16 | 12 | Sec1 | 4 | | | | |
| Example 42 | Par543 | Cel1 | 45 | 5 | 5 | 10 | Fir16 | 7 | Sec1 | 10 | | | | |
| Example 43 | Par544 | Cel1 | 45 | 5 | 5 | 10 | Fir16 | 12 | Sec1 | 10 | | | | |
| Example 44 | Par545 | Cel1 | 45 | 5 | 5 | 10 | Fir16 | 7 | Sec1 | 6 | | | Sur1 | 0.6 |
| Example 45 | Par546 | Cel1 | 45 | 5 | 5 | 10 | Fir16 | 7 | Sec1 | 6 | | | Sur2 | 0.6 |
| Example 46 | Par547 | Cel1 | 45 | 5 | 5 | 10 | Fir16 | 7 | Sec1 | 6 | | | Sur3 | 0.6 |
| Example 47 | Par548 | Cel1 | 45 | 5 | 5 | 10 | Fir16 | 7 | Sec1 | 6 | | | Sur4 | 0.6 |
| Example 48 | Par550 | Cel1 | 45 | 5 | 5 | 10 | Fir16 | 7 | Sec1 | 6 | | | Sur6 | 0.6 |
| Example 49 | Par551 | Cel1 | 45 | 5 | 5 | 10 | Fir16 | 7 | Sec1 | 6 | | | Sur7 | 0.6 |
| Example 50 | Par552 | Cel1 | 45 | 5 | 5 | 10 | Fir16 | 7 | Sec1 | 6 | | | Sur1 | 0.3 |
| Example 51 | Par553 | Cel1 | 45 | 5 | 5 | 10 | Fir16 | 7 | Sec1 | 6 | | | Sur1 | 0.9 |
| Example 52 | Par554 | Cel1 | 50 | 4 | 4 | 10 | Fir16 | 7 | Sec1 | 6 | | | | |
| Example 53 | Par555 | Cel1 | 50 | 2.5 | 4 | 10 | Fir16 | 7 | Sec1 | 6 | | | | |
| Example 54 | Par556 | Cel1 | 55 | 3 | 4 | 10 | Fir16 | 7 | Sec1 | 6 | | | | |
| Example 55 | Par557 | Cel1 | 65 | 3 | 4 | 10 | Fir16 | 7 | Sec1 | 6 | | | | |
| Example 56 | Par558 | Cel1 | 35 | 3 | 4 | 10 | Fir16 | 7 | Sec1 | 6 | | | | |
| Example 57 | Par559 | Cel1 | 20 | 3 | 4 | 10 | Fir16 | 7 | Sec1 | 6 | | | | |
| Example 58 | Par560 | Cel1 | 45 | 5 | 5 | 7 | Fir16 | 7 | Sec1 | 6 | | | | |
| Example 59 | Par561 | Cel1 | 45 | 5 | 2 | 10 | Fir16 | 7 | Sec1 | 6 | | | | |
| Example 60 | Par564 | Cel1 | 45 | 5 | 5 | 10 | | | Sec1 | 6 | | | | |
| Example 61 | Par565 | Cel1 | 45 | 5 | 5 | 10 | Fir16 | 7 | Sec3 | 6 | Sec21 | 0.018 | Sur1 | 0.6 |
| Example 62 | Par566 | Cel1 | 45 | 5 | 5 | 10 | Fir16 | 7 | Sec3 | 6 | Sec22 | 0.018 | Sur1 | 0.6 |
| Example 63 | Par567 | Cel1 | 45 | 5 | 5 | 10 | Fir16 | 7 | Sec3 | 6 | Sec23 | 0.018 | Sur1 | 0.6 |
| Example 64 | Par568 | Cel1 | 45 | 5 | 5 | 10 | Fir16 | 7 | Sec3 | 6 | Sec24 | 0.018 | Sur1 | 0.6 |
| Example 65 | Par569 | Cel1 | 45 | 5 | 5 | 10 | Fir19 | 8 | | | | | | |
| Example 66 | Par570 | Cel1 | 45 | 5 | 5 | 10 | Fir20 | 8 | | | | | | |
| Example 67 | Par571 | Cel1 | 45 | 5 | 5 | 10 | Fir21 | 8 | | | | | | |
| Example 68 | Par572 | Cel1 | 45 | 5 | 5 | 10 | Fir22 | 8 | | | | | | |
| Example 69 | Par573 | Cel1 | 45 | 5 | 5 | 10 | Fir23 | 8 | | | | | | |
| Example 70 | Par574 | Cel1 | 45 | 5 | 5 | 10 | Fir24 | 8 | | | | | | |
| Example 71 | Par575 | Cel1 | 45 | 5 | 5 | 10 | Fir25 | 8 | | | | | | |
| Example 72 | Par576 | Cel1 | 45 | 5 | 5 | 10 | Fir26 | 8 | | | | | | |
| Example 73 | Par577 | Cel1 | 45 | 5 | 5 | 10 | Fir19 | 6 | | | | | | |
| Example 74 | Par578 | Cel1 | 45 | 5 | 5 | 10 | Fir19 | 10 | | | | | | |

TABLE 1-continued

| | Particle number | Cellulose acylate species | Particle precursor production step: Amount of calcium carbonate (parts) | First stirring time (hr) | Amount of CMC (parts) | Amount of sodium hydroxide (parts) | Coating layer formation step: First-layer compound Species | First-layer compound Amount (parts) | Wax Species | Wax Amount (parts) | Polyvalent metal salt Species | Polyvalent metal salt Amount (parts) | Addition step: External additive Species | External additive Amount (parts) |
|---|---|---|---|---|---|---|---|---|---|---|---|---|---|---|
| Example 75 | Par579 | Cel1 | 45 | 5 | 5 | 10 | Fir19 | 8 | Sec1 | 4 | | | | |
| Example 76 | Par580 | Cel1 | 45 | 5 | 5 | 10 | Fir19 | 8 | Sec1 | 4 | Sec21 | 0.012 | | |
| Example 77 | Par581 | Cel1 | 45 | 5 | 5 | 10 | Fir19 | 8 | Sec1 | 4 | Sec21 | 0.012 | Sur1 | 0.6 |

TABLE 2

| | Particles | Base constituent of the particles | Percentage detachment upon sonication (%) | Volume-average particle diameter of the cellulosic particles (μm) | GSDv | Sphericity (—) | Number-average molecular weight of cellulose | Surface smoothness (%) | Biodegradability, percentage biodegradation (%) | Degree of aggregation As powder | Degree of aggregation In water | Degree of aggregation oil In |
|---|---|---|---|---|---|---|---|---|---|---|---|---|
| Example 1 | Par501 | Cellulose | 22 | 8 | 1.13 | 0.98 | 46000 | 94 | 95 | 1.1 | 1.2 | 1.2 |
| Example 2 | Par502 | Cellulose | 24 | 7 | 1.25 | 0.96 | 59000 | 93 | 79 | 1.5 | 1.5 | 1.4 |
| Example 3 | Par503 | Cellulose | 23 | 8 | 1.38 | 0.95 | 73000 | 90 | 79 | 1.4 | 1.5 | 1.4 |
| Example 4 | Par504 | Cellulose | 27 | 6 | 1.44 | 0.96 | 49000 | 95 | 84 | 1.5 | 1.5 | 1.4 |
| Example 5 | Par505 | Cellulose | 25 | 8 | 1.38 | 0.94 | 36000 | 89 | 86 | 1.8 | 1.9 | 1.7 |
| Example 6 | Par506 | Cellulose | 22 | 7 | 1.39 | 0.95 | 23000 | 88 | 87 | 1.8 | 1.9 | 1.8 |
| Example 7 | Par507 | Cellulose | 11 | 6 | 1.28 | 0.98 | 12000 | 85 | 84 | 1.8 | 1.8 | 1.9 |
| Example 8 | Par508 | Cellulose | 13 | 7 | 1.23 | 0.99 | 47000 | 96 | 90 | 1.2 | 1.2 | 1.1 |
| Example 9 | Par509 | Cellulose | 15 | 8 | 1.28 | 0.95 | 45000 | 94 | 83 | 1.5 | 1.5 | 1.5 |
| Example 10 | Par510 | Cellulose | 18 | 7 | 1.31 | 0.98 | 48000 | 93 | 81 | 1.4 | 1.5 | 1.4 |
| Example 11 | Par511 | Cellulose | 14 | 6 | 1.29 | 0.97 | 46000 | 97 | 85 | 1.5 | 1.5 | 1.4 |
| Example 12 | Par512 | Cellulose | 15 | 8 | 1.33 | 0.96 | 43000 | 95 | 83 | 1.4 | 1.5 | 1.4 |
| Example 13 | Par513 | Cellulose | 14 | 7 | 1.34 | 0.96 | 47000 | 96 | 85 | 1.4 | 1.5 | 1.4 |
| Example 14 | Par514 | Cellulose | 18 | 6 | 1.28 | 0.98 | 47000 | 93 | 83 | 1.4 | 1.4 | 1.5 |
| Example 15 | Par515 | Cellulose | 15 | 7 | 1.31 | 0.97 | 46000 | 95 | 82 | 1.4 | 1.5 | 1.4 |
| Example 16 | Par516 | Cellulose | 18 | 8 | 1.27 | 0.96 | 47000 | 94 | 88 | 1.5 | 1.4 | 1.4 |
| Example 17 | Par517 | Cellulose | 17 | 6 | 1.29 | 0.95 | 48000 | 95 | 79 | 1.4 | 1.5 | 1.5 |
| Example 18 | Par518 | Cellulose | 15 | 7 | 1.35 | 0.98 | 47000 | 96 | 85 | 1.5 | 1.5 | 1.4 |
| Example 19 | Par519 | Cellulose | 16 | 8 | 1.28 | 0.97 | 47000 | 79 | 80 | 1.8 | 1.8 | 1.8 |
| Example 20 | Par520 | Cellulose | 15 | 7 | 1.33 | 0.95 | 45000 | 94 | 81 | 1.4 | 1.5 | 1.4 |
| Example 21 | Par521 | Cellulose | 14 | 6 | 1.45 | 0.96 | 47000 | 95 | 82 | 1.4 | 1.5 | 1.5 |
| Example 22 | Par522 | Cellulose | 18 | 8 | 1.38 | 0.97 | 45000 | 96 | 83 | 1.4 | 1.5 | 1.4 |
| Example 23 | Par523 | Cellulose | 17 | 7 | 1.35 | 0.96 | 47000 | 95 | 84 | 1.5 | 1.4 | 1.4 |
| Example 24 | Par524 | Cellulose | 30 | 6 | 1.36 | 0.98 | 47000 | 96 | 65 | 1.7 | 1.8 | 1.8 |
| Example 25 | Par525 | Cellulose | 31 | 8 | 1.41 | 0.97 | 48000 | 95 | 64 | 1.9 | 1.8 | 1.9 |
| Example 26 | Par526 | Cellulose | 11 | 8 | 1.12 | 0.98 | 46000 | 98 | 90 | 1.1 | 1.1 | 1.1 |
| Example 27 | Par528 | Cellulose | 16 | 7 | 1.38 | 0.98 | 47000 | 94 | 83 | 1.4 | 1.5 | 1.4 |
| Example 28 | Par529 | Cellulose | 17 | 7 | 1.36 | 0.96 | 45000 | 93 | 81 | 1.4 | 1.5 | 1.4 |
| Example 29 | Par530 | Cellulose | 14 | 8 | 1.36 | 0.98 | 47000 | 94 | 79 | 1.4 | 1.5 | 1.4 |
| Example 30 | Par531 | Cellulose | 14 | 7 | 1.38 | 0.98 | 47000 | 95 | 81 | 1.5 | 1.5 | 1.5 |
| Example 31 | Par532 | Cellulose | 15 | 8 | 1.39 | 0.96 | 45000 | 93 | 80 | 1.4 | 1.5 | 1.4 |
| Example 32 | Par533 | Cellulose | 14 | 7 | 1.37 | 0.98 | 47000 | 92 | 82 | 1.5 | 1.4 | 1.4 |
| Example 33 | Par534 | Cellulose | 17 | 6 | 1.41 | 0.96 | 46000 | 92 | 78 | 1.4 | 1.5 | 1.5 |
| Example 34 | Par535 | Cellulose | 16 | 7 | 1.38 | 0.98 | 47000 | 91 | 77 | 1.4 | 1.4 | 1.4 |
| Example 35 | Par536 | Cellulose | 12 | 8 | 1.35 | 0.98 | 47000 | 95 | 79 | 1.5 | 1.5 | 1.4 |
| Example 36 | Par537 | Cellulose | 15 | 8 | 1.33 | 0.98 | 47000 | 94 | 78 | 1.4 | 1.4 | 1.4 |
| Example 37 | Par538 | Cellulose | 13 | 7 | 1.36 | 0.97 | 48000 | 93 | 80 | 1.5 | 1.5 | 1.5 |
| Example 38 | Par539 | Cellulose | 11 | 6 | 1.38 | 0.98 | 47000 | 95 | 77 | 1.4 | 1.4 | 1.4 |
| Example 39 | Par540 | Cellulose | 14 | 7 | 1.39 | 0.96 | 45000 | 94 | 80 | 1.5 | 1.5 | 1.5 |
| Example 40 | Par541 | Cellulose | 28 | 8 | 1.33 | 0.98 | 47000 | 95 | 66 | 1.8 | 1.9 | 1.8 |
| Example 41 | Par542 | Cellulose | 15 | 7 | 1.43 | 0.99 | 47000 | 96 | 79 | 1.5 | 1.5 | 1.4 |
| Example 42 | Par543 | Cellulose | 14 | 7 | 1.36 | 0.98 | 44000 | 93 | 78 | 1.4 | 1.5 | 1.4 |
| Example 43 | Par544 | Cellulose | 15 | 8 | 1.35 | 0.96 | 48000 | 94 | 80 | 1.4 | 1.5 | 1.4 |
| Example 44 | Par545 | Cellulose | 18 | 6 | 1.14 | 0.98 | 47000 | 95 | 77 | 1.1 | 1.2 | 1.1 |
| Example 45 | Par546 | Cellulose | 19 | 8 | 1.33 | 0.99 | 45000 | 93 | 74 | 1.1 | 1.1 | 1.1 |
| Example 46 | Par547 | Cellulose | 15 | 7 | 1.32 | 0.96 | 47000 | 94 | 75 | 1.4 | 1.5 | 1.4 |
| Example 47 | Par548 | Cellulose | 14 | 8 | 1.38 | 0.96 | 47000 | 94 | 76 | 1.4 | 1.5 | 1.4 |
| Example 48 | Par550 | Cellulose | 22 | 7 | 1.32 | 0.98 | 47000 | 92 | 63 | 1.8 | 1.8 | 1.9 |
| Example 49 | Par551 | Cellulose | 25 | 8 | 1.33 | 0.98 | 45000 | 93 | 62 | 1.9 | 1.8 | 1.9 |
| Example 50 | Par552 | Cellulose | 13 | 7 | 1.45 | 0.97 | 4800 | 94 | 81 | 1.5 | 1.5 | 1.4 |
| Example 51 | Par553 | Cellulose | 15 | 8 | 1.27 | 0.98 | 47000 | 95 | 71 | 1.4 | 1.5 | 1.4 |
| Example 52 | Par554 | Cellulose | 18 | 7 | 1.69 | 0.98 | 47000 | 96 | 77 | 1.5 | 1.5 | 1.5 |

TABLE 2-continued

| | Particles | Base constituent of the particles | Percentage detachment upon sonication (%) | Volume-average particle diameter of the cellulosic particles (μm) | GSDv | Sphericity (—) | Number-average molecular weight of cellulose | Surface smoothness (%) | Biodegradability, percentage biodegradation (%) | Degree of aggregation As powder | In water | oil In |
|---|---|---|---|---|---|---|---|---|---|---|---|---|
| Example 53 | Par555 | Cellulose | 24 | 8 | 1.74 | 0.97 | 46000 | 95 | 66 | 1.8 | 1.8 | 1.9 |
| Example 54 | Par556 | Cellulose | 15 | 3 | 1.44 | 0.98 | 47000 | 94 | 74 | 1.4 | 1.5 | 1.4 |
| Example 55 | Par557 | Cellulose | 27 | 2 | 1.45 | 0.98 | 47000 | 89 | 63 | 1.9 | 1.9 | 1.8 |
| Example 56 | Par558 | Cellulose | 26 | 9 | 1.38 | 0.97 | 47000 | 95 | 77 | 1.4 | 1.5 | 1.4 |
| Example 57 | Par559 | Cellulose | 28 | 11 | 1.31 | 0.98 | 45000 | 88 | 66 | 1.9 | 1.9 | 1.9 |
| Example 58 | Par560 | Cellulose | 17 | 8 | 1.33 | 0.91 | 47000 | 95 | 80 | 1.4 | 1.5 | 1.4 |
| Example 59 | Par561 | Cellulose | 49 | 7 | 1.35 | 0.85 | 47000 | 87 | 66 | 1.8 | 1.9 | 1.8 |
| Example 60 | Par564 | Cellulose | 18 | 8 | 1.33 | 0.98 | 46000 | 95 | 80 | 1.5 | 1.4 | 1.5 |
| Example 61 | Par565 | Cellulose | 19 | 8 | 1.35 | 0.98 | 46000 | 94 | 65 | 1.1 | 1.1 | 1.2 |
| Example 62 | Par566 | Cellulose | 19 | 7 | 1.36 | 0.98 | 45000 | 95 | 65 | 1.1 | 1.1 | 1.2 |
| Example 63 | Par567 | Cellulose | 19 | 8 | 1.38 | 0.98 | 46000 | 94 | 63 | 1.1 | 1.1 | 1.2 |
| Example 64 | Par568 | Cellulose | 19 | 7 | 1.15 | 0.98 | 46000 | 93 | 65 | 1.1 | 1.1 | 1.2 |
| Example 65 | Par569 | Cellulose | 19 | 8 | 1.33 | 0.98 | 46000 | 94 | 78 | 1.1 | 1.1 | 1.2 |
| Example 66 | Par570 | Cellulose | 22 | 8 | 1.29 | 0.96 | 45000 | 95 | 69 | 1.5 | 1.4 | 1.5 |
| Example 67 | Par571 | Cellulose | 24 | 8 | 1.47 | 0.96 | 46000 | 93 | 68 | 1.4 | 1.4 | 1.5 |
| Example 68 | Par572 | Cellulose | 33 | 7 | 1.43 | 0.95 | 46000 | 89 | 61 | 1.8 | 1.9 | 1.8 |
| Example 69 | Par573 | Cellulose | 35 | 8 | 1.55 | 0.94 | 45000 | 88 | 61 | 1.8 | 1.9 | 1.9 |
| Example 70 | Par574 | Cellulose | 25 | 7 | 1.41 | 0.95 | 46000 | 93 | 68 | 1.4 | 1.5 | 1.5 |
| Example 71 | Par575 | Cellulose | 24 | 8 | 1.41 | 0.95 | 45000 | 94 | 69 | 1.5 | 1.4 | 1.5 |
| Example 72 | Par576 | Cellulose | 27 | 8 | 1.39 | 0.96 | 46000 | 95 | 74 | 1.4 | 1.4 | 1.5 |
| Example 73 | Par577 | Cellulose | 19 | 7 | 1.39 | 0.96 | 45000 | 96 | 75 | 1.1 | 1.1 | 1.2 |
| Example 74 | Par578 | Cellulose | 19 | 8 | 1.45 | 0.97 | 46000 | 95 | 75 | 1.1 | 1.1 | 1.2 |
| Example 75 | Par579 | Cellulose | 19 | 1 | 1.38 | 0.96 | 45000 | 93 | 76 | 1.1 | 1.1 | 1.2 |
| Example 76 | Par580 | Cellulose | 19 | 8 | 1.33 | 0.95 | 46000 | 92 | 76 | 1.1 | 1.1 | 1.2 |
| Example 77 | Par581 | Cellulose | 19 | 8 | 1.35 | 0.96 | 45000 | 91 | 75 | 1.1 | 1.1 | 1.2 |
| Comparative Example 1 | Par101 | Cellulose | 78 | 14 | | 0.97 | 110000 | 98 | 79 | 2.5 | 2.8 | 2.7 |
| Comparative Example 2 | Par102 | Cellulose | 52 | 14 | | 0.98 | 110000 | 90 | 25 | 1.5 | 2.2 | 1.9 |
| Comparative Example 3 | Par103 | Cellulose | 89 | 12 | | 0.55 | 110000 | 45 | 24 | 1.5 | 2.5 | 1.6 |
| Comparative Example 4 | Par104 | Cellulose | 79 | 10 | | 0.97 | 45000 | 90 | 78 | 2.3 | 2.7 | 3.1 |
| Comparative Example 5 | Par111 | Cellulose | 75 | 10 | | 0.96 | 21000 | 82 | 80 | 2.7 | 2.8 | 3.2 |
| Comparative Example 6 | Par112 | Cellulose | 78 | 12.7 | | 0.96 | 12000 | 79 | 80 | 2.4 | 2.9 | 2.8 |
| Comparative Example 7 | Par113 | Cellulose | 72 | 4 | | 0.95 | 44000 | 90 | 78 | 2.5 | 2.9 | 2.7 |
| Comparative Example 8 | Par114 | Cellulose | 72 | 8.2 | | 0.96 | 45000 | 90 | 79 | 2.7 | 2.8 | 2.6 |

The "Base constituent of the particles" in Table 2 represents the base constituent of the cellulosic particles or core particles (i.e., the constituent that makes up 90% by mass or more of the cellulosic particles or core particles).

These results indicate that the cellulosic particles according to the Examples may be superior in biodegradability and unlikely to aggregate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A cellulosic particle comprising:

a core particle containing a cellulose as a base constituent; and a coating layer covering the core particle, wherein:

the coating layer has a first coating layer covering the core particle and containing at least one selected from the group consisting of polyethyleneimine and polylysine, and a second coating layer covering the first coating layer and containing the carnauba wax and a polyvalent metal salt, the cellulosic particle has a surface hydrophobicity such that a percentage detachment upon sonication of hydrophobized silica particles attached thereto is 50% or less, the polyvalent metal salt is contained in an amount of 0.3% to 1% by mass relative to a mass of the carnauba wax.

2. The cellulosic particle according to claim 1, further comprising at least one external additive selected from the group consisting of a silicon-containing compound particle and a metallic soap particle.

3. The cellulosic particle according to claim 2, wherein the silicon-containing compound particle is a silica particle.

4. The cellulosic particle according to claim 1, wherein a volume-average particle diameter of the cellulosic particles is 3 μm or more and less than 10 μm.

5. The cellulosic particle according to claim 1, wherein an upper geometric standard deviation by number GSDv of the cellulosic particles is 1.0 or greater and 1.7 or less.

6. The cellulosic particle according to claim 1, wherein sphericity of the cellulosic particle is 0.90 or greater.

7. The cellulosic particle according to claim 1, wherein a number-average molecular weight of the cellulose is 37000 or more.

8. The cellulosic particle according to claim 7, wherein the number-average molecular weight of the cellulose is 45000 or more.

9. The cellulosic particle according to claim 1, wherein surface smoothness of the cellulosic particle is 80% or higher.

10. The cellulosic particle according to claim 1, wherein the polyvalent metal salt consists of a metal ion having a valency of two or more and an inorganic anion.

* * * * *